(No Model.)

C. J. HORTON.
HOOF PAD.

No. 606,343. Patented June 28, 1898.

Witnesses:
E. B. Bolton
M. G. Foley

Inventor:
Cornelius J. Horton
By Charles L. Rogers
his Attorney

UNITED STATES PATENT OFFICE.

CORNELIUS J. HORTON, OF WHITE PLAINS, NEW YORK.

HOOF-PAD.

SPECIFICATION forming part of Letters Patent No. 606,343, dated June 28, 1898.

Application filed May 22, 1897. Serial No. 637,662. (No model.)

*To all whom it may concern:*

Be it known that I, CORNELIUS J. HORTON, a citizen of the United States, and a resident of White Plains, in the county of Westchester, in the State of New York, have invented certain new and useful Improvements in Hoof-Pads, of which the following is a specification.

This invention relates to hoof-pads for horses; and the object of the invention is to provide an article of this character which embodies simplicity of construction and durability and which affords ventilation for the hoof of the animal and also distributes a portion of the weight of the animal upon the frog of the foot; and with this and other objects in view the invention consists, substantially, of the construction and arrangement of parts hereinafter more fully described in the specification, and illustrated in the accompanying drawings, in which—

Figure 1:
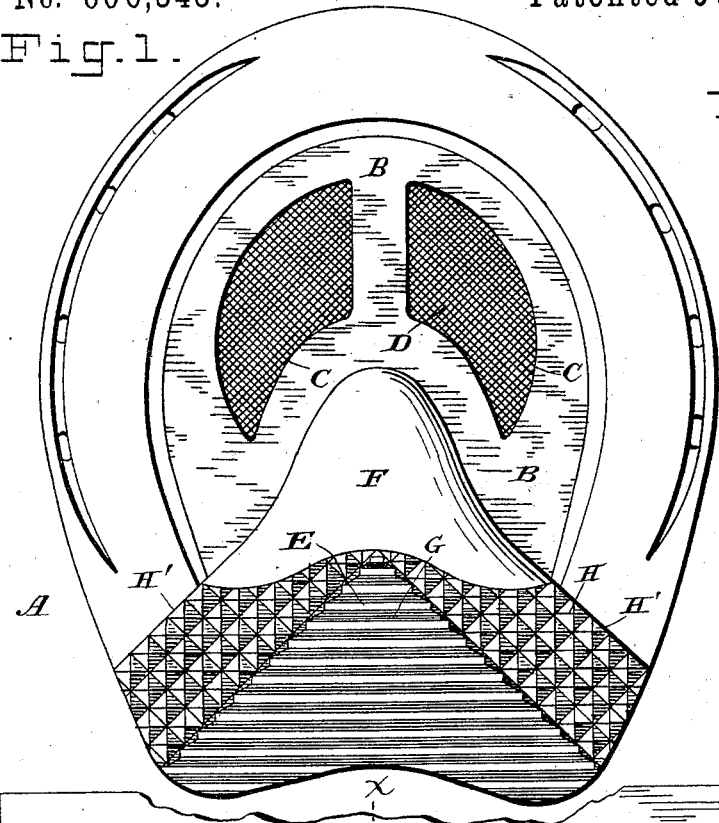
Figure 3:
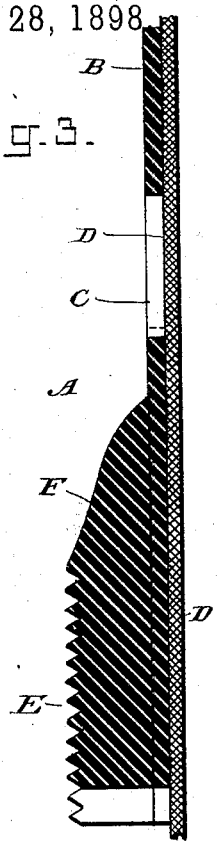
Figure 2:
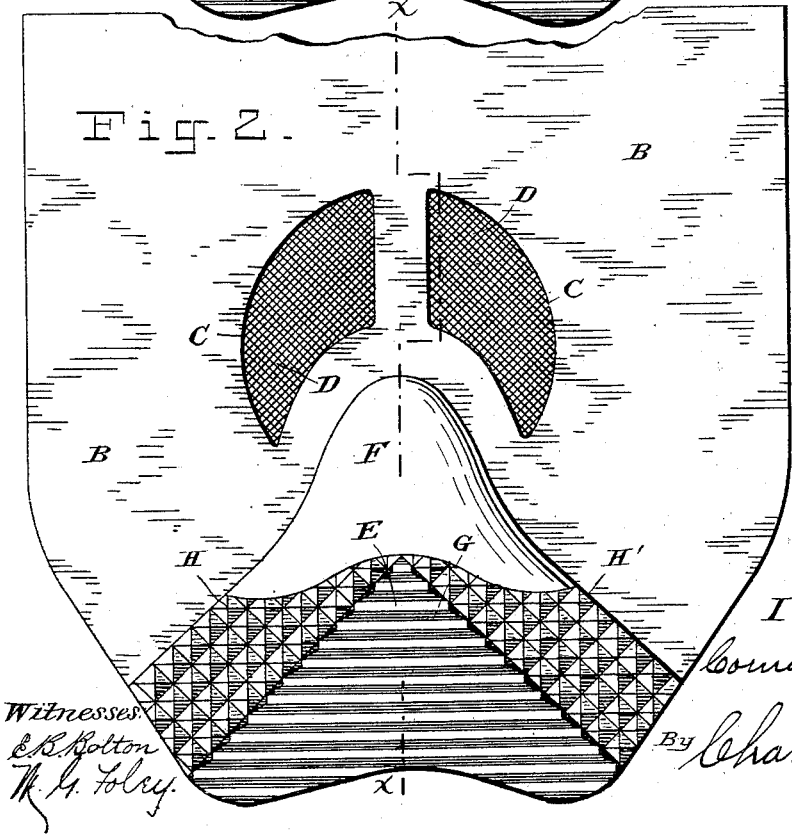

Figure 1 is a plan view of a hoof-pad embodying my invention, showing the metal shoe in position. Fig. 2 is a view similar to Fig. 1 with the metal shoe removed, and Fig. 3 is a vertical longitudinal section on line $x$ $x$ of Fig. 2.

Similar characters of reference designate like parts throughout the several views.

Referring to the drawings, the letter A designates a hoof-pad constructed in accordance with my invention, consisting of a main portion or plate B, of rubber and canvas, leather, or any desired material, in which are formed openings C of any preferred form or of any desired number, the object of these holes being to afford ingress and egress of air to the hoof of the animal, and upon the back or under surface of the plate B is secured in any desired manner a backing D of any woven fabric or any material having openings or meshes therein to permit of ventilation for the hoof and at the same time practically cover the openings C in the plate B and to prevent the plate from coming in contact with the hoof of the animal and at the same time to retain any packing or medicated substance in position within the hoof.

The plate B is constructed of sufficient size to fit the hoofs of large or small horses, and the edges thereof which project beyond the metal shoe when the latter has been nailed in position upon the hoof of the animal are cut or trimmed off by the blacksmith, and the same will then appear as shown in Fig. 1, and upon the rear portion of said plate B is secured or connected the heel portion or frog E, and this frog is preferably molded and pressed thereon in such a manner that both the plate B and frog E become one homogeneous whole, and this effect is accomplished by the same process or step by which the frog is formed.

The frog E is preferably provided with a central extension or tongue F, the upper portion of which tapers or is inclined forwardly and laterally, and the upper surface or top of the tongue is slightly convex, so that a uniformly convex surface is thus provided and all corners or angles are avoided, and by means of forming the plate B and the frog E into one homogeneous whole, as before described, the latter is rendered more secure and the better enabled to withstand the strain of constant use.

The central outer or bearing portion of the frog E is preferably provided with a corrugated or ribbed surface G, and the outer edges thereof are formed into pointed or pyramidal projections H, which construction is designed to increase the adhesion between the frog and the smooth or uneven surfaces with which it comes in contact and to prevent the animal from slipping; but I do not confine myself to the foregoing construction, as the same may be changed in practice if found desirable. The portions H', against which the extremities or heels of the metal shoe bear, are inwardly inclined or are on substantially the same horizontal angle as the tongue F, and the extremities or heels of the metal shoes are cut off obliquely to fit snugly against the inclined portions H', as clearly shown in Fig. 1.

By means of the construction of the frog E above described all shoulders, angles, or angular projections are dispensed with, and the pad is thereby rendered more durable, for it is well known that pads of this character are subjected to a great strain and that they always break or tear along the line of meeting of two parts or of two portions of the whole, and thus the entire pad is rendered useless.

I do not confine myself to the particular construction or arrangements of parts herein shown and described, and I reserve the right to make all such changes therein and modifications thereof as fairly come within the scope of my invention.

My improved pad is designed to be placed upon the hoof of the animal in the usual manner and to be held thereon by the nails which secure the metal shoe in position, and if it is desired to pack the hoof with any medicated or other substance it is only necessary to pack such substance within the hoof and place the pad over the same and secure the metal shoe in position in the usual manner.

Having accurately described my invention, what I claim, and desire to secure by Letters Patent, is—

1. A hoof-pad provided with an apertured plate having a ventilating-backing extending over the apertures therein.

2. A hoof-pad provided with an apertured plate, having connected thereto a frog or heel-piece, and a ventilating-backing for said plate.

3. A hoof-pad provided with an apertured plate, a ventilating-backing upon the rear surface thereof, and a pointed frog or heel-piece upon one end of said plate.

4. A hoof-pad provided with an apertured plate, a ventilating-backing therefor, and a frog or heel-piece upon one end of said plate, said frog having a tapering central extension and outwardly-inclined sides adapted to receive the oblique extremities of the metal shoe.

In testimony that I claim the foregoing as my invention, I have signed my name, in presence of two witnesses, this 18th day of May, 1897.

CORNELIUS J. HORTON.

Witnesses:
CHARLES S. ROGERS,
M. G. FOLEY.